United States Patent
Diefenbaugh et al.

(10) Patent No.: US 7,259,769 B2
(45) Date of Patent: Aug. 21, 2007

(54) DYNAMIC BACKLIGHT AND IMAGE ADJUSTMENT USING GAMMA CORRECTION

(75) Inventors: Paul S. Diefenbaugh, Beaverton, OR (US); David A. Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 10/674,363

(22) Filed: Sep. 29, 2003

(65) Prior Publication Data

US 2005/0068332 A1    Mar. 31, 2005

(51) Int. Cl.
G09G 5/02    (2006.01)

(52) U.S. Cl. ............ 345/604; 345/591; 345/600; 345/601; 348/602; 348/687; 358/519; 358/523

(58) Field of Classification Search ......... 345/589, 345/591, 600–605; 358/519–523; 348/674–675, 348/655–656, 645–687, 602–603, 591, 604
See application file for complete search history.

(56) References Cited

U.S. PATENT DOCUMENTS

| | | | | |
|---|---|---|---|---|
| 5,414,538 A | * | 5/1995 | Eschbach | 358/522 |
| 5,774,112 A | * | 6/1998 | Kasson | 345/601 |
| 5,956,015 A | * | 9/1999 | Hino | 345/600 |
| 6,064,396 A | * | 5/2000 | Ouchi et al. | 345/604 |
| 6,101,272 A | * | 8/2000 | Noguchi | 382/167 |
| 6,304,269 B1 | * | 10/2001 | Ito | 382/167 |
| 6,340,975 B2 | * | 1/2002 | Marsden et al. | 345/590 |
| 6,664,973 B1 | * | 12/2003 | Iwamoto et al. | 345/589 |
| 6,826,303 B2 | * | 11/2004 | D'Souza et al. | 382/167 |
| 6,847,374 B2 | * | 1/2005 | Matsuda | 345/589 |
| 7,042,436 B2 | * | 5/2006 | Rossi | 345/102 |
| 2002/0196470 A1 | * | 12/2002 | Kawamoto et al. | 358/3.06 |
| 2003/0011616 A1 | * | 1/2003 | D'Souza et al. | 345/600 |

* cited by examiner

Primary Examiner—Kee M. Tung
Assistant Examiner—Antonio Caschera
(74) Attorney, Agent, or Firm—Blakely, Sokoloff, Taylor & Zafman LLP (57) ABSTRACT

Methods and apparatuses for the application of image intensity and luminance adjustment and gamma adjustment for the purpose of compensating perceived image brightness, and thus enhancing the range of display backlight brightness adjustment that may be applied to conserve power, while minimizing impact to image color shade, hue or saturation characteristics.

18 Claims, 9 Drawing Sheets

DYNAMIC BACKLIGHT AND IMAGE ADJUSTMENT USING GAMMA CORRECTION

TECHNICAL FIELD

The invention relates to display device control. More particularly the invention relates to dynamically adjusting image brightness using color look-up table correction.

BACKGROUND

Because batteries provide power to operate a laptop computer or other portable electronic device for a limited period of time, a need exists to efficiently use the power available to provide the longest possible operating period. This need has resulted in various power saving techniques such as, for example, shutting down or reducing power in components that are not being heavily used, or where policy is to prefer power savings over performance.

One component that can have power reduced during periods of inactivity or when power conservation is preferred is the LCD panel and backlight. In a typical laptop computer, for example, the display can consume 30% or more of the power consumed by the system. In order to reduce display power consumption, some laptop computer systems reduce the panel backlighting when in battery-powered mode. However, because LCDs are transmissive display devices (i.e., LCDs depend on the quantity and quality of the backlight source for producing the perceived color gamut), reduction of backlight brightness alone results in an image that the user often perceives as of lower quality than the same image with a brighter backlighting.

Display image quality is further affected by ambient light surrounding the display, which can reduce the environments in which a user may feel comfortable using a battery powered device that adjusts the backlight to save power, which is especially important considering the self-contained battery power-source is one of the key factors facilitating mobility that allows the use to move at will between different indoor and outdoor environments.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for dynamically controlling image brightness and/or backlight intensity based on ambient light levels are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
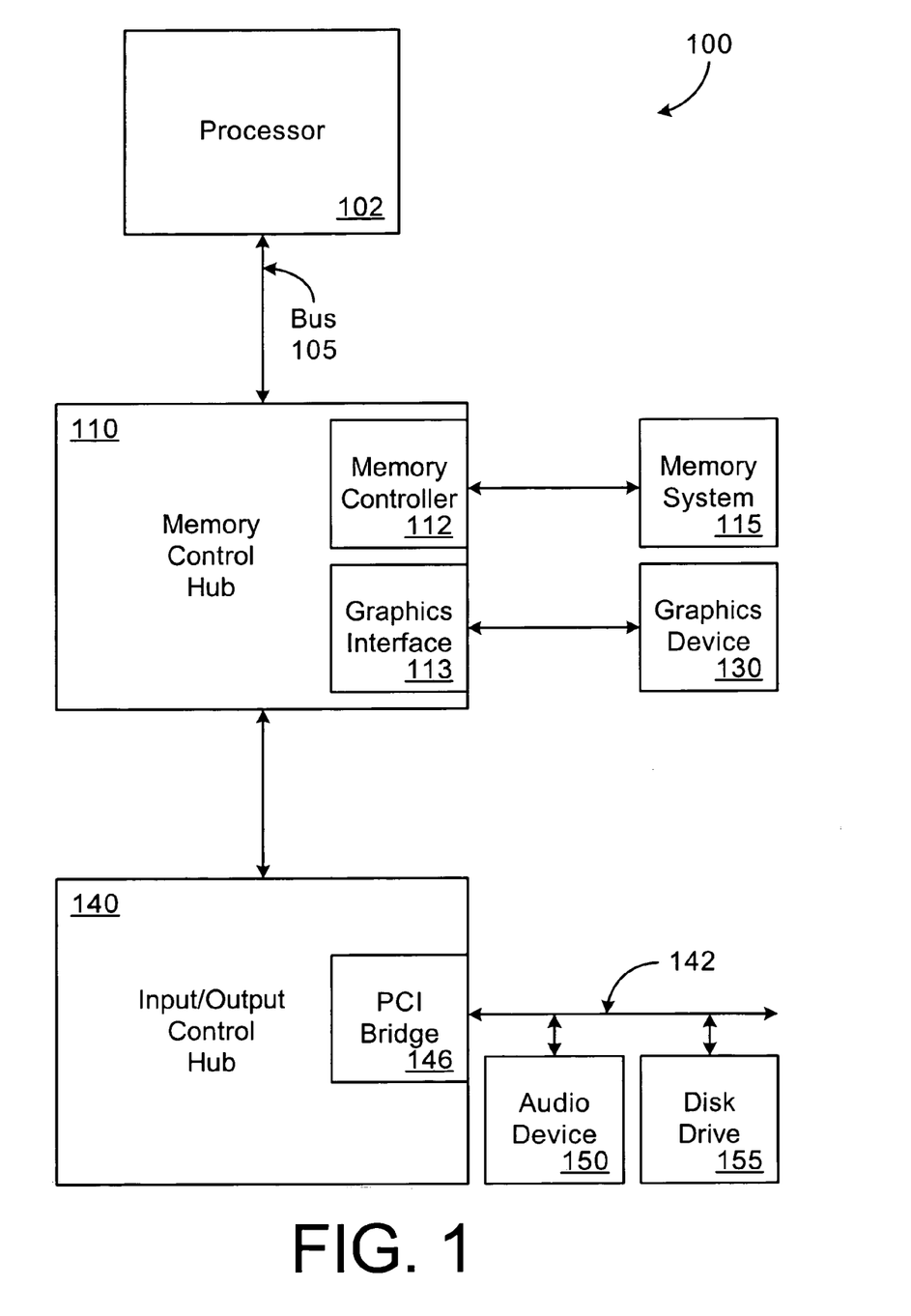
FIG. 1 is a block diagram of one embodiment of an electronic system.

The image adaptation technique described herein can be applied to a broad class of electronic systems having associated display devices. While the examples herein are generally directed to laptop computers, the techniques described can be applied to personal digital assistants (PDAs), palm top computers, desktop computers using flat panel displays, kiosk displays, etc. FIG. 1 is a block diagram of one embodiment of an electronic system. Electronic system 100 includes processor 102 coupled to bus 105. In one embodiment, processor 102 is a processor in the Pentium family of processors including the Pentium® II processor family, Pentium® III processors, Pentium® 4 processors, and Pentium-M processors available from Intel Corporation of Santa Clara, Calif. Alternatively, different and/or other processors may be used, such as Intel's StrongArm processor, XScale processor, ARM processors available from ARM Ltd. of Cambridge, the United Kingdom, or OMAP processor (an enhanced ARM-based processor) available from Texas Instruments, Inc., of Dallas, Tex.

Memory Control Hub (MCH) 110 is also coupled to the bus 105. MCH 110 may include memory controller 112 that is coupled to memory system 115. Memory system 115 stores data and sequences of instructions that are executed by processor 102 or any other device included in electronic system 100. In one embodiment, memory system 115 includes dynamic random access memory (DRAM); however, memory system 115 may be implemented using other memory types, for example, static random access memory (SRAM), or other configurations of integration, for example processor including memory controller. Additional and/or different devices not included in FIG. 1 may also be coupled to bus 105 and/or MCH 110.

MCH 110 may also include graphics interface 113 coupled to graphics device 130. In one embodiment, graphics interface 113 includes an accelerated graphics port (AGP) that operates according to an AGP Specification Revision 2.0 interface or PCI-Express Interface developed by Intel Corporation of Santa Clara, Calif. In another embodiment graphics device may be integrated with MCH forming a GMCH (Graphics and Memory Controller Hub). Other embodiments may be possible such as when MCH is integrated with the processor and Graphics Controller. In all cases Graphics Controller portion is referred to as Graphics Interface wherever contained therein.

In one embodiment, a flat panel display may be coupled to graphics interface 113 through, for example, a signal converter that translates a digital representation of an image stored in a storage device such as video memory or system memory into display signals that are interpreted and displayed by the flat-panel screen. Display signals produced by the display device may pass through various control devices before being interpreted by and subsequently displayed on the flat-panel display monitor. Other graphics interfaces and protocols can also be used.

MCH 110 is further coupled to input/output control hub (ICH) 140, which provides an interface to input/output (I/O) devices. ICH 140 may be coupled to, for example, a Peripheral Component Interconnect (PCI) bus adhering to a Specification Revision 2.1 bus developed by the PCI Special Interest Group of Portland, Oreg. Thus, in one embodiment, ICH 140 includes PCI bridge 146 that provides an interface to PCI bus 142. PCI bridge 146 provides a data path between processor 102 and peripheral devices. In another embodiment MCH and ICH are integrated together and also include PCI or other device/bridge function. In one embodiment, PCI bus 142 is coupled with audio device 150 and disk drive 155. However, other and/or different devices may be coupled to PCI bus 142. In addition, processor 102 and MCH 110 could be combined to form a single chip.

In addition, other and/or different peripheral devices may also be coupled to ICH 140 in various embodiments. For example, such peripheral devices may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, electronic system 100 can receive electrical power from one or more of the following sources for its operation: a battery, alternating current (AC) outlet (e.g., through a transformer and/or adaptor), automotive power supplies, airplane power supplies, and the like.

Figure 2:
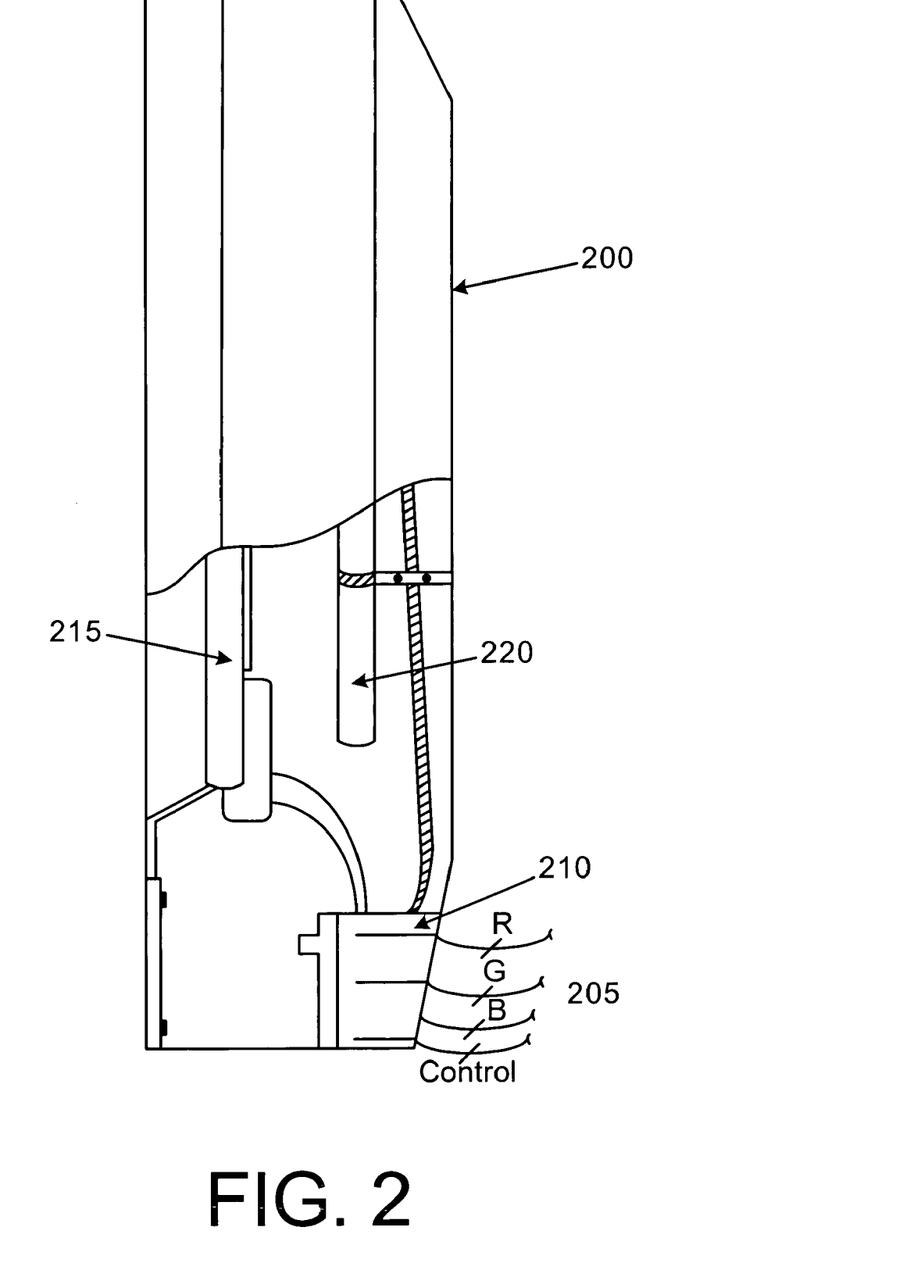
FIG. 2 illustrates a cross-section of one embodiment of a flat-panel display monitor.

FIG. 2 illustrates a cross-section of one embodiment of a flat-panel display monitor 200. In one embodiment, display signals 205 generated by a display device, such as a graphics accelerator, are interpreted by flat-panel monitor control device 210 and subsequently displayed by enabling pixels within flat-panel monitor screen 215. The pixels are illuminated by backlight 220, the brightness of which effects the brightness of the pixels and therefore the brightness of the displayed image.

As described in greater detail herein, the brightness of backlight 220 can be adjusted to provide more efficient power usage, to provide appropriate brightness based on ambient conditions, and/or to compensate for image intensity changes. The color intensity values for the pixels can also be adjusted based on ambient conditions and/or backlight intensity.

Figure 3:
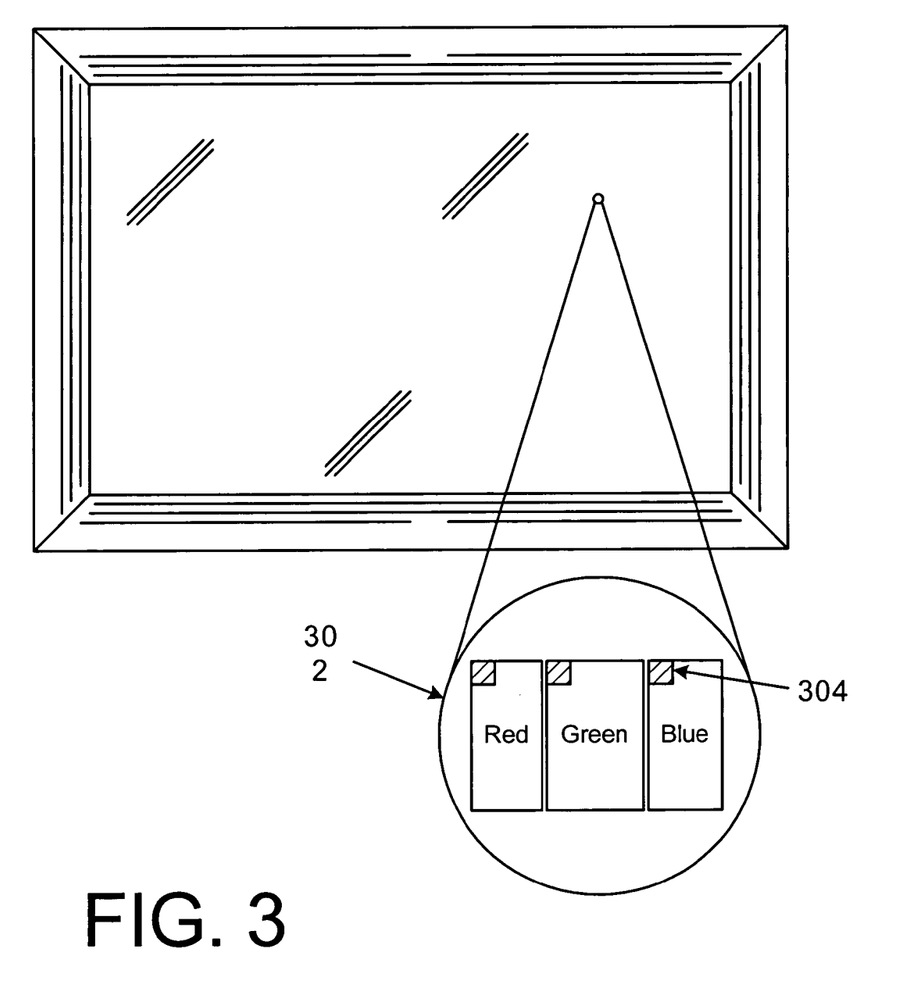
FIG. 3 illustrates a group of pixels within a flat-panel monitor screen.

FIG. 3 illustrates a group of pixels within a flat-panel monitor screen. In one embodiment, the pixels are formed using thin film transistor (TFT) technology, and each pixel is composed of three sub-pixels 302 that, when enabled, cause a red, green, and blue (RGB) color to be displayed, respectively. Each sub-pixel is controlled by a TFT (e.g., 304). A TFT enables light from a display backlight to pass through a sub-pixel, thereby illuminating the sub-pixel to a particular color. Each sub-pixel color may vary according to a combination of bits representing the sub-pixel. The number of bits representing a sub-pixel determines the number of colors, or color depth, that may be displayed by a sub-pixel. Sub-pixel coloring is known in the art and any appropriate technique for providing sub-pixel coloring can be used.

A brighter or dimmer luminance of a color being displayed by a pixel can be achieved by scaling the value representing each sub-pixel color (red, green, and blue, respectively) within the pixel. The particular values used to represent different colors depends upon the color-coding scheme, or color space, used by the particular display device. By modifying the color luminance of the sub-pixels (by scaling the values representing sub-pixel colors) the perceived brightness of the display image may be modified on a pixel-by-pixel basis.

In one embodiment, color luminance is adjusted via modification of the color look-up table in a graphics controller, which adjust the sub-pixel colors prior to being sent to the display device. Furthermore, by modifying the color intensity or luminance of each pixel, the amount of backlight necessary to create a display image of a particular display image quality can be modified accordingly. For example, increased brightness caused by manipulation of the color look-up table to provide opportunity to decrease backlight intensity and therefore a reduction in power consumption.

Figure 4:
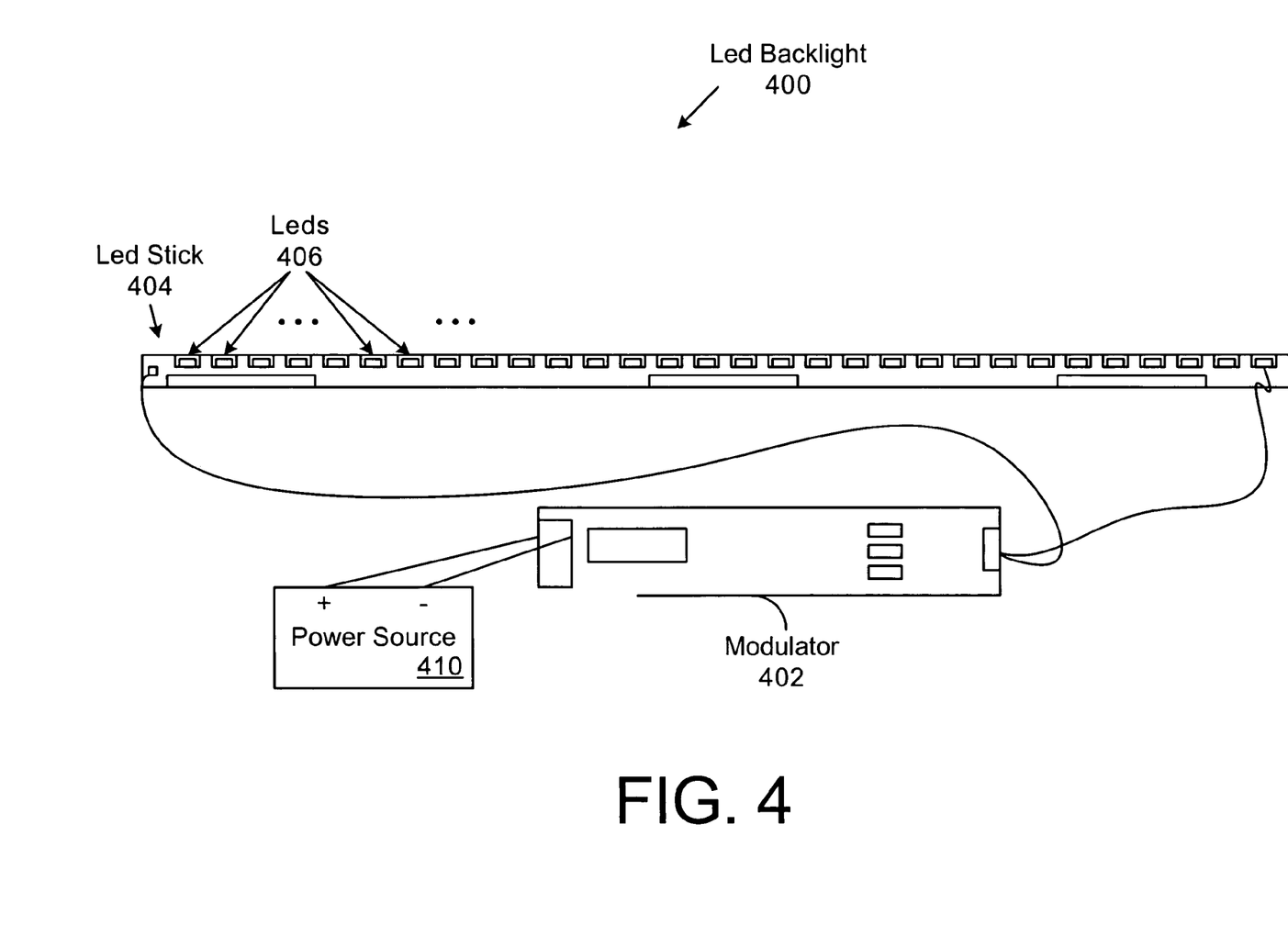
FIG. 4 illustrates one embodiment of a light emitting diode (LED) backlight for a notebook computer display system.

FIG. 4 illustrates one embodiment of a light emitting diode (LED) backlight for a notebook computer display system. In one embodiment, LED backlight 400 includes modulator 402, and LED stick 404, which includes LEDs 406. For example, LED stick 404 can include any number of LEDs. In one embodiment, LEDs 406 are white LEDs; however, LEDs 406 can be, for example, blue or ultraviolet LEDs. Modulator 402 receives power from power source 410, which can be a battery (e.g., a 12 Volt battery) or other power source. Modulator 402 controls the intensity of backlighting provided by LEDs 406.

Figure 5:
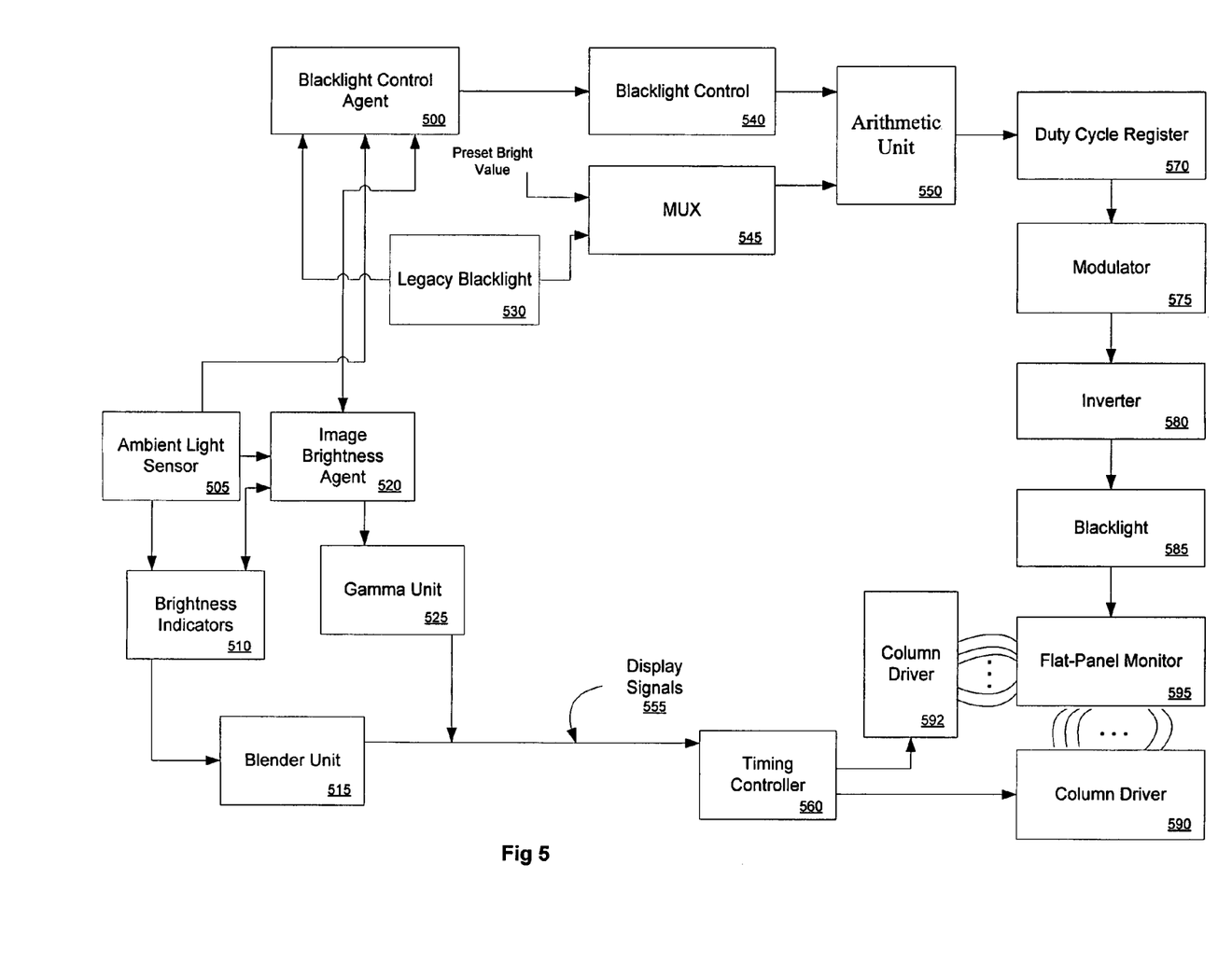
FIG. 5 illustrates one embodiment of a display control system that can provide backlight control and image brightness control for a display device.

FIG. 5 illustrates one embodiment of a display control system that can provide backlight control and image brightness control for a display device. In one embodiment, the device for which flat-panel monitor 595 provides images, or an enclosure for flat-panel monitor 595 includes ambient light sensor 505. Flat-panel monitor 595 may be an LCD, plasma, or any type of flat-panel display. Alternatively, ambient light sensor 505 can be part of another component or be a separate component so long as ambient light sensor 505 provides information corresponding to the ambient light level in the environment in which flat-panel monitor 595 is to operate.

Output signals from ambient light sensor 505 are provided to backlight control agent 500 and image brightness agent 520. As described in greater detail below, the signals from the ambient light sensor can be used to dynamically adjust the image brightness and/or the backlight intensity in response to the ambient light conditions in which flat-panel monitor 595 is operating. Image brightness agent 520 and backlight control agent 500 can be implemented as hardware, software or a combination of hardware and software. In one embodiment, backlight control agent 500 and image brightness agent 520 are logically different components. Alternatively, backlight control agent 500 and image brightness agent 520 are included in a single component.

In one embodiment, image brightness agent 520 adjusts the perceived color brightness and contrast of an image to be displayed by modifying a look-up table in gamma unit 525 based on the ambient light level. In another embodiment gamma adjustment is done using a piece-wise gamma adjustment function. In one embodiment, the backlight intensity can be modified to compensate for color intensity changes. In an alternate embodiment, backlight control agent 500 adjusts the intensity of the backlight based on the ambient light level and image brightness agent 520 compensates for the change in backlight intensity by adjusting image color brightness by modifying the look-up table in gamma unit 525, or by adjusting the inflection points in the piece-wise gamma approximation function.

In one embodiment, image brightness agent 520 receives one or more signals from ambient light sensor 505 indicating the ambient light level in the environment in which flat-panel monitor 595 operates. Image brightness agent 520 determines a level of image brightness and/or backlight intensity modification that can be made based on the ambient light level and communicates desired backlight intensity changes to backlight control agent 500. In one embodiment, backlight control agent 500 writes value representing a scaling factor to backlight control register 540. As described in greater detail below, in one embodiment, the value stored in backlight control register 540 is combined with one or more other values to generate a duty cycle to control backlight intensity.

In general an image to be displayed on flat-panel monitor 595 is communicated via display signals 555, which enable timing controller 560 to activate appropriate column and row drivers 590 and 592, respectively, to display an image on flat-panel monitor 595. In one embodiment, blender unit 515 creates an image to be displayed on the display monitor by combining a display image with other display data, such as texture(s), lighting, and/or filtering data. These techniques are known in the art.

In one embodiment, the display image from blender unit 515 and the output of gamma unit 525 are combined generate display signals 555 which are transmitted to timing controller 560 as discussed above. Graphics gamma unit 525 determines the brightness (luminance) of pixels in an image to be displayed by scaling each sub-pixel color. In one embodiment, graphics gamma unit 525 can be programmed to scale the sub-pixel color on a per-pixel basis in order to achieve greater luminance in some areas of the display image, while reducing the luminance in other areas of the display image.

In one embodiment, display image brightness indicators 510 include data indicating image brightness determined by monitoring and accumulating pixel color within the display image. The display image brightness indicators 510 can then indicate to image brightness agent 520 the brightness of certain features within the display image, such as display image character and background brightness.

As described above, backlight control agent 500 is coupled with ambient light sensor 505 and image brightness agent 520 to control the intensity of backlight 585. Backlight control agent 500 is also coupled with legacy backlight control register 530. In one embodiment, legacy backlight control register 530 is a PCI Config register in a graphics controller that is accessed by system BIOS or other hardware to provide a value used for direct legacy control of backlight intensity. In one embodiment, multiplexor 545 is coupled to legacy backlight control register 530 and to receive a preset brightness value (e.g., maximum brightness, baseline brightness).

Arithmetic unit 550 is coupled to receive a value stored in legacy backlight control register 540 and from multiplexor 545 (i.e., either the preset brightness value or the value stored in legacy backlight control register 530). Arithmetic unit 550 combines the values received from backlight control register 540 and multiplexor 545 to generate a backlight control value that is stored in duty cycle register 570. In one embodiment, a duty cycle of a pulse width modulated (PWM) signal is modified to cause a corresponding modification to the backlight intensity. In alternate embodiments, other techniques can be used to modify backlight intensity.

The value stored in duty cycle register 570 is used by modulator 575 to generate a signal to control the luminance (brightness) of backlight 585. In one embodiment, modulator 575 may include, or be coupled with, integrated inverter 580, for example, an industry Siemens flat panel display technology (I-SFT) inverter, which directly controls backlight 585.

Figure 6:
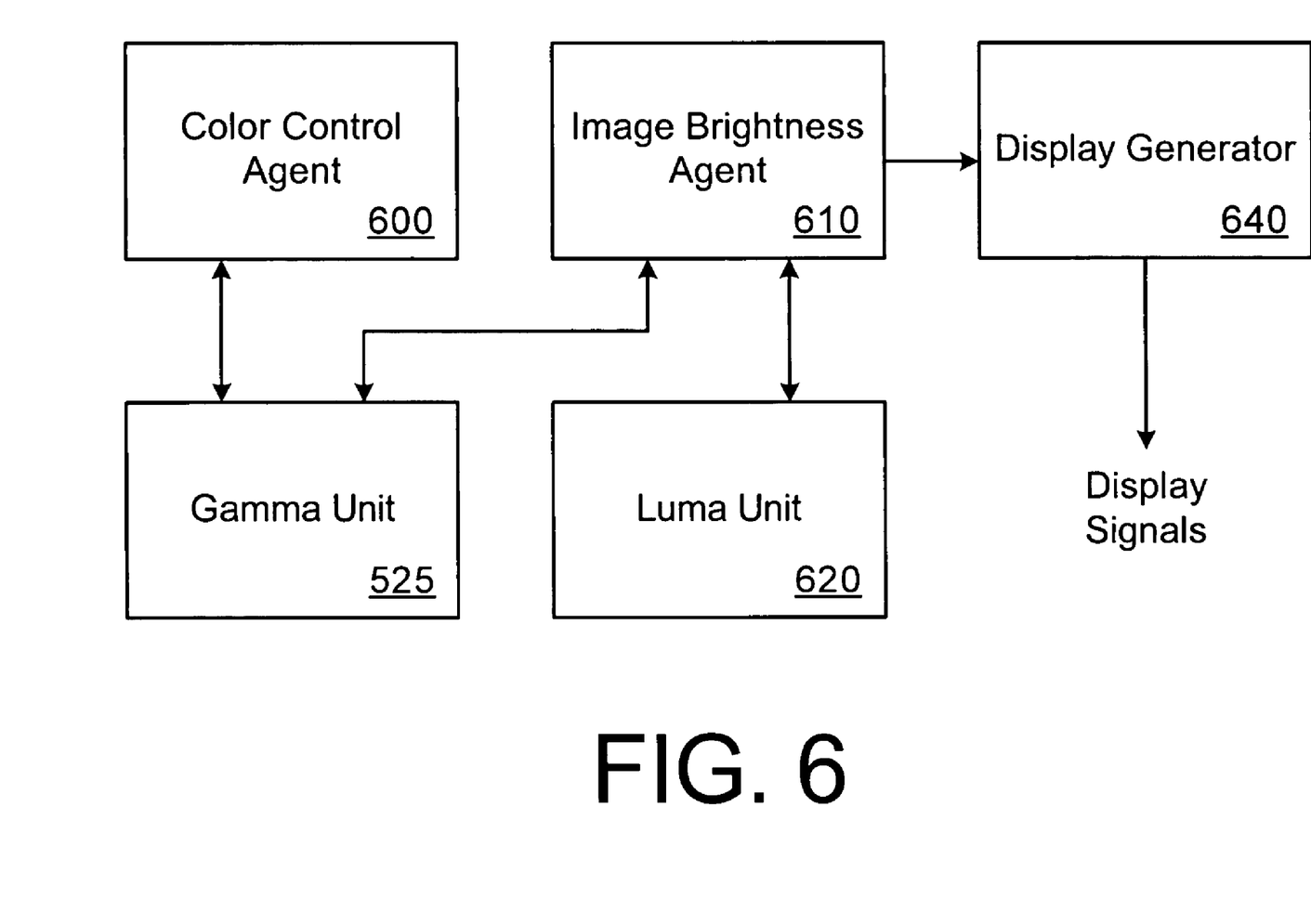
FIG. 6 is a block diagram of one embodiment of a two-phase look-up table architecture for use in brightness image adjustment.

FIG. 6 is a block diagram of one embodiment of a two-phase look-up table architecture for use in brightness image adjustment. Color control agent 600 can be any component known in the art, whether software or hardware, that accesses gamma unit 525. For example, color control agent 600 can be an operating system or a monitor driver. Color control agent 600 typically accesses gamma unit 525 for color correction purposes. For example, color control agent 600 can use gamma unit 525 to compensate for physical differences between display devices.

As described above, image brightness agent 610 can use gamma unit 525 to make image color brightness modifications based on environmental conditions or changes to backlight intensity. However, using a single gamma unit for multiple purposes may result in a less than optimal output because the various components that modify and/or use the single color look-up table may not communicate and therefore may not compensate for actions by other components. Certain types of color adjustments in RGB color-space, via control of the independent red, green and blue primaries, may introduce errors in the color shade, hue or saturation which limits the range of possible brightness adjustment. Use of multiple color look-up tables can be accomplished without introducing additional image artifacts, and therefore limiting backlight brightness range and potential power savings. In one embodiment, gamma unit 525 is used for traditional purposes by color control agent 600.

In one embodiment, image brightness agent monitors the use of gamma unit 525 by color control agent 600 for use as a factor in color brightness modifications. Image brightness agent 610 uses luma unit 620 to adjust color brightness as described above. The modified color data are provided to display generator 640, which generates display signals to be provided to the display device. The display signals can be generated in any manner known in the art.

Figure 7:
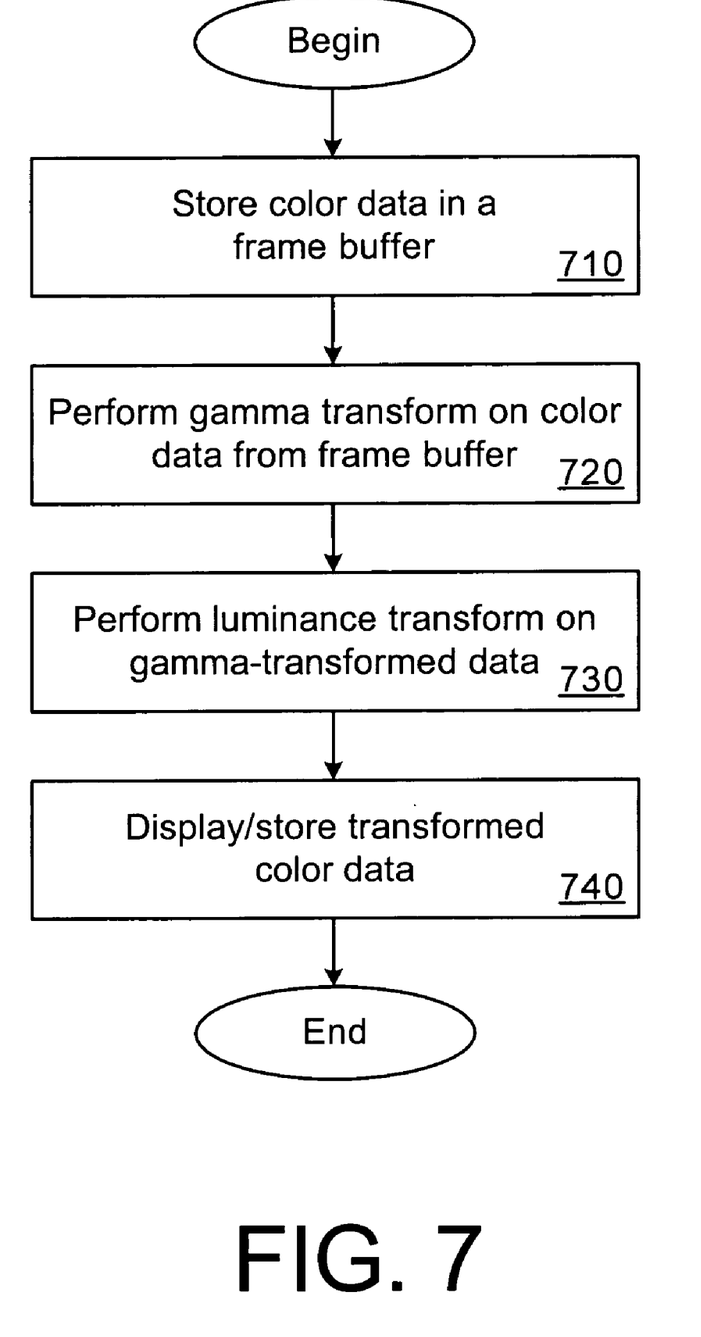
FIG. 7 is a flow diagram for one embodiment of a technique for use of a two-phase look-up table for brightness image adjustment.

FIG. 7 is a flow diagram for one embodiment of a technique for use of a two-phase look-up table for brightness image adjustment. Color data from an image source provides color data that is stored in a frame buffer, 710.

In one embodiment, a gamma transform, or color adjustment, is performed on the color data stored in the frame buffer, 720. In one embodiment, the color adjustment is performed by accessing a color look-up table that is stored by the device providing the image to be displayed. In another embodiment gamma adjustment is done using a piece-wise gamma adjustment function that is applied by the device providing the image to the display. The color adjustment can be used to compensate for physical characteristics of a display device or printer being used, for example. Use and modification of color look-up tables and gamma transfer functions to compensate for color characteristics is known in the art.

In one embodiment, a brightness, or luminance, transform is performed on the color transformed data, 730. The brightness transform can be used to adjust the color brightness of all or a portion of the image to be displayed. In one embodiment, the color adjustment is performed by accessing a color look-up table (luma table) that is stored by the device providing the image to be displayed. The color look-up table for the brightness modification is a different color look up table than is used for the color adjustment.

In one embodiment, the brightness transform is performed based on an ambient light level as determined by an ambient light sensor. Alternatively, the image brightness can be adjusted based on an image brightness profile of the image, which can be determined by analyzing the relative brightness of each pixel or groups of pixels. In one embodiment, changes in image brightness are be combined with corresponding changes in backlight intensity so that a viewer of the image can perceive little or no difference between the original image and the image with the modified brightness.

FIG. 7 has been described in terms of performing a gamma transform and then performing a brightness adjustment on the color adjusted data. In an alternate embodiment (not illustrated in FIG. 7), the brightness adjustment can be performed before the color adjustment. The brightness and color adjusted data is then either stored or displayed, 740.

Figure 8:
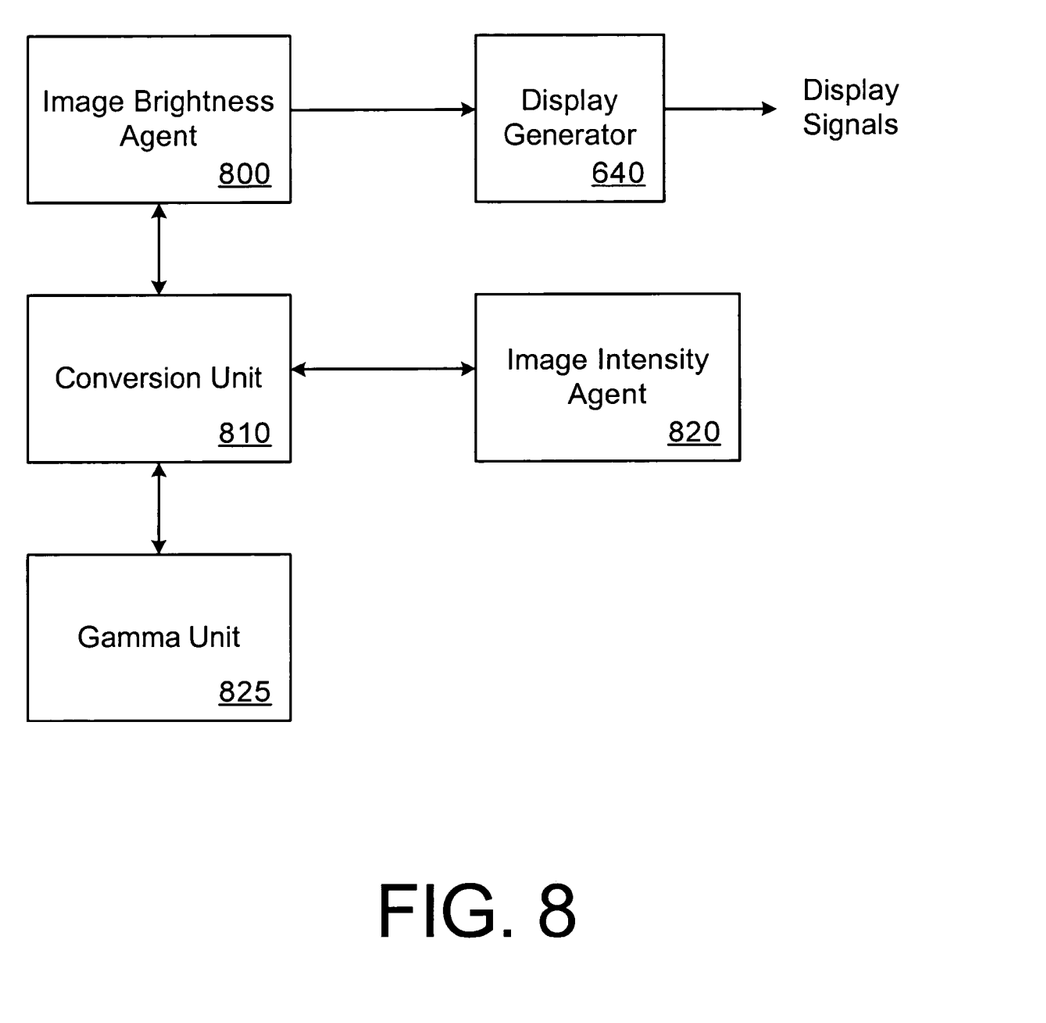
FIG. 8 is a block diagram of one embodiment of a color space transformation architecture for use in brightness image adjustment.

FIG. 8 is a block diagram of one embodiment of a color space transformation architecture for use in brightness image adjustment. Image brightness agent 800 sends color data for an image to be displayed to conversion unit 810.

Conversion unit 810 converts the color data for the image between two or more color spaces. In one embodiment, conversion unit 810 is configured to convert color pixel data from the red-green-blue (RGB) color space to the hue-saturation-intensity (HSI) color space. Conversion unit can also convert from HSI color space to RGB color space. Techniques for conversion between RGB color space to HSI color space as well as conversion from HSI color space to RGB color space are known in the art. Any appropriate conversion technique can be used. Use of HSI color space may be desirable due to implicit expression of HSI colors using an intensity axis, which makes modification of apparent intensity while mitigating impact to other aspects of color less computationally intensive than in RGB color space.

Conversion between other color spaces such as YUV, YCrCb, CIE (Commission Internationale de l'Eclairage), HSV (hue-saturation-value), YIQ, CMYK (cyan-magenta-yellow-black), RBGA (red-green-blue-alpha), Pantone, Munsell, NCS or other color spaces can also be supported and will have varying benefits and tradeoffs depending on the color-space of the content. For example if the content is motion picture information in YUV color-space, adjusting the luminance in YCrCb may be more appropriate than HSI.

The color data in HSI color space is transmitted to image intensity agent 820, which modifies the color brightness of one or more portions of the image by modifying the intensity values for the portions of the image being modified. In one embodiment, image intensity agent 820 receives signals from an ambient light sensor that indicates an ambient light level for a display device that will be used to display the image.

Image intensity agent 820 can modify the image brightness based on the ambient light level. Image intensity agent 820 can also control, or be coupled to a device that controls, a backlight source for the display device. In one embodiment, the backlight intensity is modified to offset the changes to the image intensity caused by image intensity agent 820.

The modified data in HSI color space is transmitted back to conversion unit 810, which converts the HSI color data to RGB color space. Conversion unit 810 provides the RGB color data to gamma unit 825. Gamma unit 825 performs color correction as described above in the RGB color space.

In one embodiment, the HSI color space adjustments are made after the RGB color space adjustments. In an alternate embodiment, the RGB color space adjustments are made after the HSI color space adjustments. The modified color data are provided to display generator 640, which generates display signals to be provided to the display device. The display signals can be generated in any manner known in the art.

Figure 9:
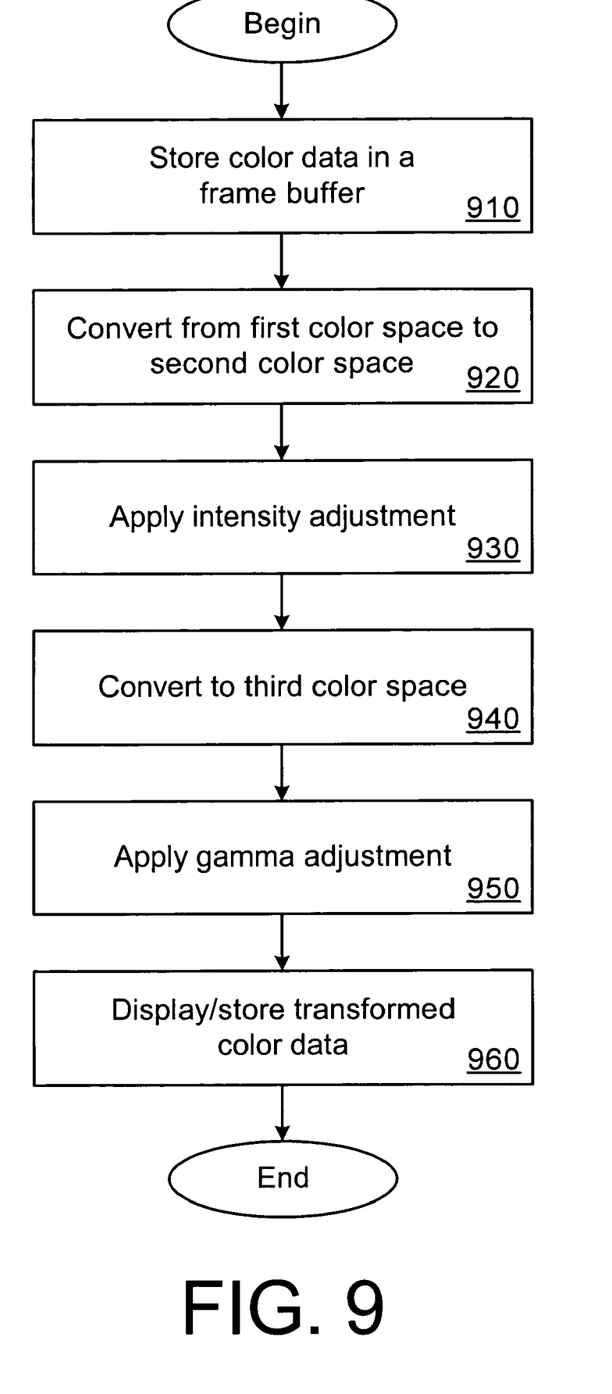
FIG. 9 is a flow diagram for one embodiment of a technique for use of color space transformation for color brightness adjustment.

FIG. 9 is a flow diagram for one embodiment of a technique for use of color space transformation for color brightness adjustment. Color data from an image source provides color data that is stored in a frame buffer, 910.

The color data from the frame buffer is converted from a first color space (e.g. RGB, YUV) to a second color space (e.g., HSI), 920. An intensity adjustment is applied in the second color space, 930. The intensity-adjusted color data is converted from the second color space to a third color space, 940. A gamma adjustment is applied to the color data coming the third color space, 950. In one embodiment, the third color-space is the same RGB color-space as the first, however other color-spaces may be used as appropriate for the display and display interface technology e.g. for connection to a Video Display transmission in YUV color-space may be preferable. Any of the color spaces listed herein can be used for color space conversion as described with respect to FIG. 9.

FIG. 9 has been described in terms of performing a color space conversion and an intensity adjustment and then performing a conversion back to the original color space on the intensity-adjusted color data and performing a color adjustment in the original color space. In an alternate embodiment (not illustrated in FIG. 9), the color adjustment can be performed before the color space conversion and intensity adjustment. The brightness and color adjusted data is then either stored or displayed, 960.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   a first memory to store color data for an image, wherein the color data is stored in a first color space;
   a first conversion agent communicatively coupled with the first memory to receive the color data in the first color space and to convert the color data to a second color space;
   a color brightness agent communicatively coupled with the first conversion agent to modify color brightness characteristics, using the second color space, of one or more portions of the image, wherein the color brightness agent is to modify the color brightness characteristics based at least in part on a change in backlight intensity;
   a second conversion agent communicatively coupled with the color brightness agent to convert the color data from the second color space to a third color space;
   a gamma control agent communicatively coupled with the second conversion agent to selectively perform a gamma transformation on the color data in the third color space;

a second memory communicatively coupled with the gamma control agent to store the modified color data in the third color space, wherein the third color space is the color space to be used to display the image;

a color control agent communicatively coupled with the second memory to further modify the modified color data in the third color space, wherein the color control agent uses a color look-up table storing data in the first color space to further modify the color data; and a third memory communicatively coupled with the color control agent to store the further modified color data in the third color space.

2. The apparatus of claim 1 wherein the first memory, the second memory and the third memory comprise a single memory device.

3. The apparatus of claim 1 wherein the color control agent comprises a processor executing instructions.

4. The apparatus of claim 1 wherein the first color space comprises a red-green-blue (RGB) color space and the second color space comprises a hue-saturation-intensity (HSI) color space.

5. The apparatus of claim 1 wherein the first color space comprises a YUV color space and the second color space comprises a hue-saturation-intensity (HSI) color space.

6. The apparatus of claim 1 wherein the first color space is chosen from the group of YUV, YCrCb, CIE, HSV, YIQ, CMYK, RBGA, Pantone, Munsell, NCS and the second color space is chosen from the group of YUV, YCrCb, CIE, HSV, YIQ, CMYK, RBGA, Pantone, Munsell, NCS.

7. The apparatus of claim 1 wherein the color brightness agent comprises a processor executing instructions.

8. The apparatus of claim 1 wherein the color brightness agent uses a color look-up table or gamma transfer function storing data in the second color space to modify the color data.

9. The apparatus of claim 1 further comprising an ambient light sensor communicatively coupled with the color brightness agent to provide data indicating an ambient light level, wherein the color brightness agent uses the ambient light level to modify the color data.

10. The apparatus of claim 1, wherein the color brightness agent controls a backlight intensity of a display device.

11. A system comprising.

a bus;

a graphics accelerator;

a first memory coupled with the bus to store color data for an image, wherein the color data is stored in a first color space, a first conversion agent communicatively coupled with the bus to receive the color data in the first color space and to convert the color data to a second color space;

an ambient light sensor communicatively coupled with the first conversion agent; a color brightness agent communicatively coupled with the bus to modify color brightness characteristics of one or more portions of the image, wherein the color brightness agent is to modify the color brightness characteristics based at least in part on a change in backlight intensity;

a second conversion agent communicatively coupled with the bus to convert the modified color data from the second color space to a third color space, wherein the third color space comprises the color space to be used to display the image;

a gamma control agent communicatively coupled with the second conversion agent to selectively perform a gamma transformation on the color data in the third color space;

a second memory communicatively coupled with the bus to store the transformed color data in the third color space;

a color control agent communicatively coupled with the second memory to further modify the transformed color data in the third color space, wherein the color control agent uses a color look-up table storing data in the first color space to further modify time color data; and a third memory communicatively coupled with the color control agent to store the further modified color data in the third color space.

12. The system of claim 11 wherein the first memory, the second memory and the third memory comprise a single memory device.

13. The system of claim 11 wherein the first color space comprises a red-green-blue (RGB) color space and the second color space comprises a hue-saturation-intensity (HSI) color space.

14. The system of claim 11 wherein the first color space comprises a YUV color space and the second color space comprises a hue-saturation-intensity (HSI) color space.

15. The system of claim 11 wherein the first color space is chosen from the group of YUV, YCrCb, CW, HSV, YIQ, CMYK, RBGA, Pantone, Munsell, NCS and the second color space is chosen from the group of YUV, YCrCb, CIE, HSV, YIQ, CMYK, RBGA, Pantone, Munsell, NCS.

16. The system of claim 11 wherein the color brightness agent comprises a processor executing instructions.

17. The system of claim 11 wherein the color brightness agent is to use one or more of a color look-up table and a gamma transfer function storing data in the second color space to modify the color data.

18. The system of claim 11, wherein the color brightness agent is to control a backlight intensity of a display device.

* * * * *

UNITED STATES PATENT AND TRADEMARK OFFICE
CERTIFICATE OF CORRECTION

PATENT NO. : 7,259,769 B2 Page 1 of 1
APPLICATION NO. : 10/674363
DATED : August 21, 2007
INVENTOR(S) : Diefenbaugh et al.

It is certified that error appears in the above-identified patent and that said Letters Patent is hereby corrected as shown below:

In column 10, at line 39, delete "CW" and insert --CIE--.

Signed and Sealed this

Fifteenth Day of April, 2008

JON W. DUDAS
*Director of the United States Patent and Trademark Office*